Jan. 30, 1968  J. W. GARDNER  3,366,077
METHOD AND APPARATUS FOR MAKING NOVELTY CANDY PRODUCT
Filed Oct. 26, 1964  2 Sheets-Sheet 1
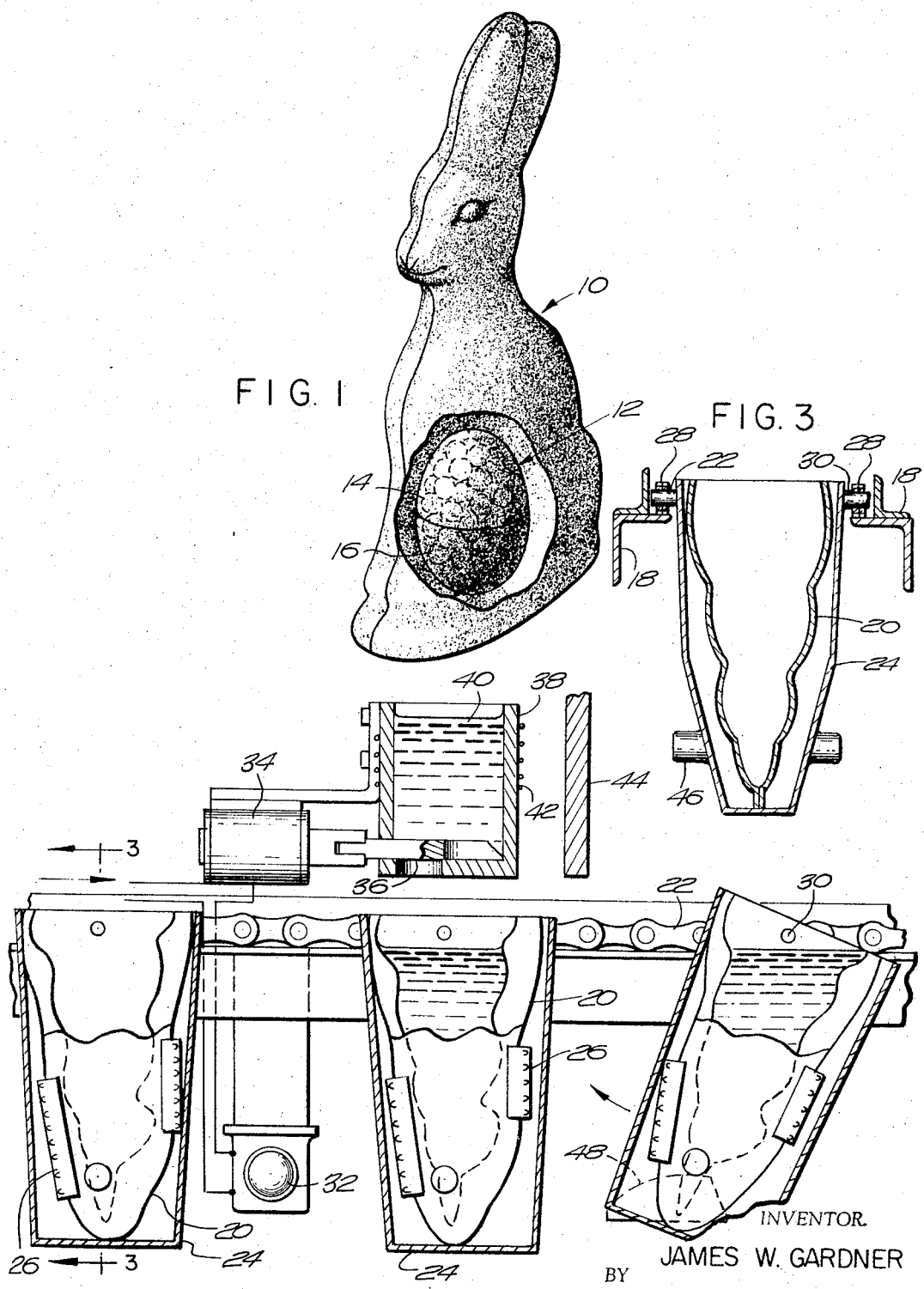

Jan. 30, 1968    J. W. GARDNER    3,366,077
METHOD AND APPARATUS FOR MAKING NOVELTY CANDY PRODUCT
Filed Oct. 26, 1964    2 Sheets-Sheet 2
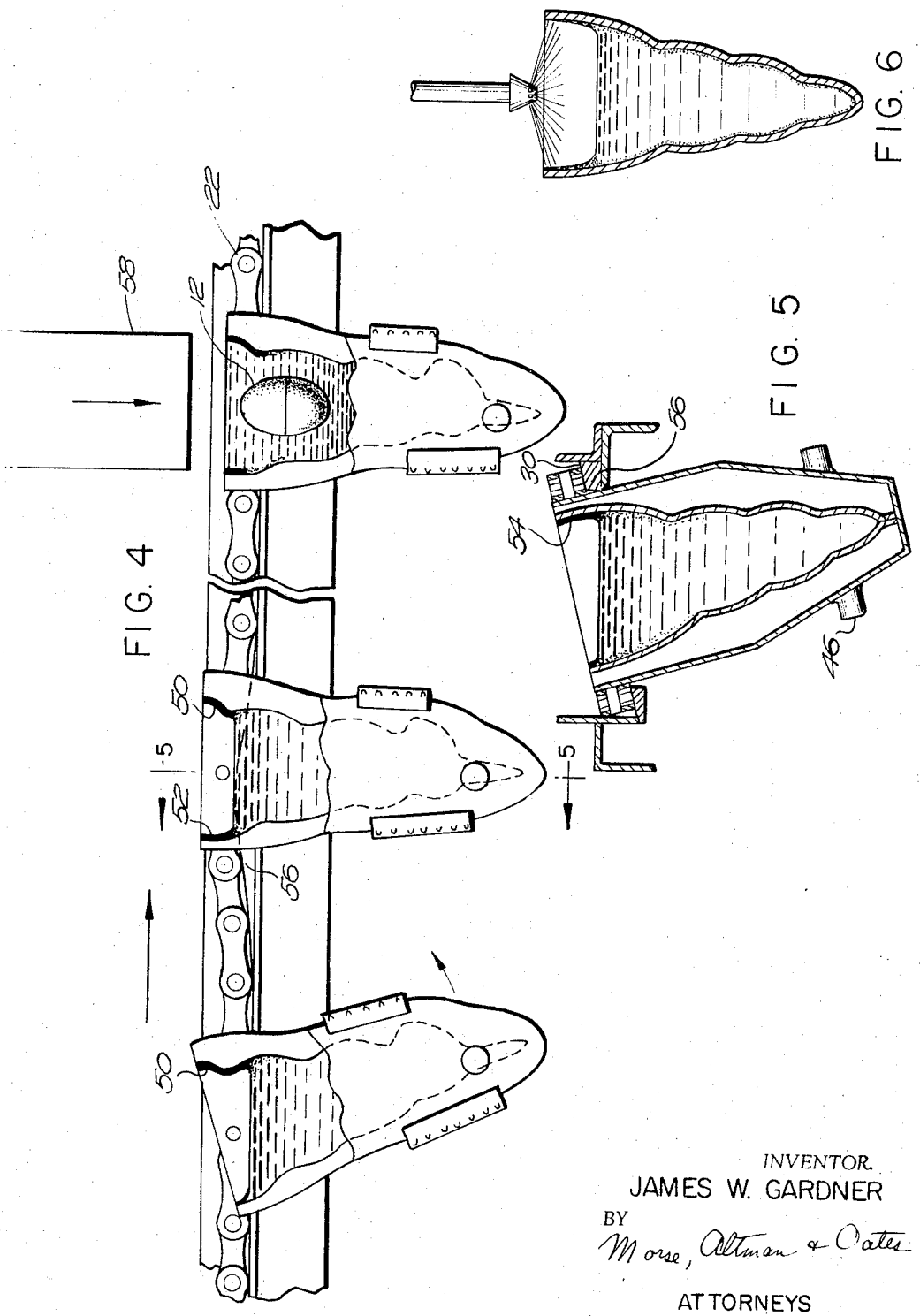
INVENTOR.
JAMES W. GARDNER
BY
Morse, Altman & Oates
ATTORNEYS

United States Patent Office 3,366,077
Patented Jan. 30, 1968

3,366,077
METHOD AND APPARATUS FOR MAKING NOVELTY CANDY PRODUCT
James W. Gardner, Tyrone, Pa., assignor to J. A. Gardner Importing Company, Inc., Tyrone, Pa., a corporation of Pennsylvania
Filed Oct. 26, 1964, Ser. No. 406,395
7 Claims. (Cl. 107—1)

This invention relates generally to novelty candy products and their manufacture and more particularly is directed towards a molded candy product having a prize object encapsulated therein. This invention also is directed towards a novel method and apparatus for manufacturing a prize filled molded candy product.

Most candy products are made of a single confectionery such as chocolate or the like which may or may not be molded into a fanciful shape. Some confectioneries may comprise a mixture in which other edible ingredients such as fruits, nuts or other fillings are contained within the candy. Normally, candies with center fillings are made by pouring the chocolate or other coating over the nut, fruit or the like and allowing the coating to harden. Candies of this sort, of course, may not be molded into fanciful shapes but rather may be made only in small candy pieces or bar form.

It is an object of the present invention to provide a molded candy product having an edible or inedible prize object encapsulated wholly therein.

Another object of this invention is to provide a novel method for producing a molded candy product with an edible or inedible object lodged wholly therein.

Still another object of this invention is to provide a novel apparatus for manufacturing molded candy products having edible or inedible objects lodged wholly therein.

More particularly, this invention features a novelty candy product comprising a molded body portion of solid edible candy having a fanciful configuration and completely encapsulating an object which may be edible or inedible and in the nature of a prize item preferably of a character related to the particular fanciful configuration of the body portion.

Another feature of this invention involves a novel process for the manufacture of the above candy and includes the steps of partially filling a relatively cool open mold with a charge of molten candy of a type that hardens at room temperature, secondly coating the walls of the mold with the candy by tipping the mold back and forth and, while the remaining portion of the candy charge is still in molten form, inserting the object into the mold opening below the surface of the molten candy thereby displacing the liquid candy to an extent to completely cover the object and to fill the mold. The candy is then allowed to harden completely and then the mold is removed.

Another feature of this invention involves a novel apparatus for manufacturing candy products of the foregoing type. This apparatus includes a conveyor system for carrying a number of molds along a predetermined path, an automatic dispensing station in which each mold is given a measured charge of molten candy, a cooling chamber and means within the cooling chamber for tipping each mold from side to side and back and forth sufficiently to cause the molten candy within each mold to cover the walls of each mold with a coating of the candy which will harden thereon. Within the cooling chamber there is located a second dispensing station adapted to insert an object into each mold as it passes therethrough.

However, these and other features of the invention, along with further objects and advantages thereof, will become more fully apparent from the following detailed description of a preferred embodiment of the invention, with reference being made to the accompanying drawings, in which:

FIG. 1 is a view in perspective, partly cut away, showing a molded candy product made according to the invention, FIG. 2 is a view in side elevation partly in section showing a conveyor system candy dispensing station for the manufacture of candy products of the type shown in FIG. 1, FIG. 3 is a cross-sectional view taken along the line 3—3 of FIG. 2, FIG. 4 is a view in side elevation partly in section showing a further portion of the conveyor system and including an object dispensing station, FIG. 5 is a cross-sectional view taken along the line 5—5 of FIG. 4, and FIG. 6 is a cross-sectional view in side elevation showing a modification of the invention.

Referring now to the drawings and to FIG. 1 in particular there is shown a molded candy figure 10 which in this instance is a fanciful representation of a bunny although a variety of other molded figures could obviously be depicted. In practice, the candy figure 10 may be molded from milk chocolate or other suitable material, such as a product sold under the trademark Milkcote, which is made up of sugar, vegetable fat, skim and whole milk solids, cocoa, an emulsifier such as lecithin, flavoring such as vanillin and salt. Another material which may be used is that sold under the trademark, Whitecote, which is made from sugar, whole and non-fat dry milk solids, vegetable fat, an emulsifier and artificial flavoring.

The candy bunny 10 is characterized by an encapsulated prize object 12 located wholly within the molded figure near the base portion thereof. It will be noted that the prize object is spaced at all points from the exterior of the molded figure so that no part of the object is exposed but rather is completely encapsulated within the candy.

In practice, the prize object 12 may be edible or inedible and may be of any non-toxic material suitable as a surprise item for children and the like. For example, in the FIG. 1 embodiment, the prize object is an egg-shaped container 14 made in two sections joined along their center line and containing a quantity of candy such as jelly beans 16, nuts or the like. The egg-shaped container 14 may be of rigid molded plastic such as PVC or may be made from an edible material so that the entire prize object 12 may be consumed. In place of the egg-shaped container 14 another prize object might be used such as a three-dimensional toy for example. Also, the egg-shaped container 14 might be retained and the toy placed within the container in place of the jelly beans shown. Various items could obviously be substituted as desired.

Normally, molded candy figures such as the bunny shown in FIG. 1 are made by filling the mold with melted chocolate or the like and allowing the filling to harden before the mold is removed. While this procedure is satisfactory for manufacturing conventional molded candy figures, it is unsatisfactory for use in producing a molded candy figure having a prize object encapsulated therein. This is due to the fact that if the prize object were inserted in a mold filled with entirely molten candy, a portion of the prize object may be exposed through the surface of the figure after it becomes hardened unless great care is taken properly to insert the object within the molten candy and to hold it in position until the candy completely hardens.

According to the present invention, a quantity of molten, hardenable candy such as chocolate or the like is deposited in the cavity of a mold which is relatively cool in relation to the molten candy. The cavity walls are then coated with the candy by tilting the mold from side to side and back and forth so that a candy skin forms in the cavity walls and solidifies. With the mold cavity covered by the solidfied candy skin and a pool of molten candy still remaining within the mold, a prize object is submerged into the pool so as to displace a quantity of the molten candy up and over the object completely covering the object and filling the mold cavity. Since the cavity walls are protected by the hardened candy skin no particular care need be taken with respect to the positioning of the prize object since the hardened skin will prevent any part of the prize object from touching the cavity walls where it would be exposed in the finished product. With the prize object submerged, the remainder of the molded candy is allowed to harden and then the mold is removed.

As an alternative to tipping the mold back and forth in order to cover the cavity walls with a protective skin, molten candy may be initially sprayed against the cavity walls which, as before, would be cooler than the molten candy. With this technique, the sprayed candy would also form a hardened skin and a substantial portion would run down and collect inside the mold to form the liquid pool in which the prize object will be submerged before complete solidfication takes place.

Referring now more particularly to FIGS. 2 through 5, there is illustrated an apparatus for the automatic manufacture of the molded candy figure of FIG. 1. This apparatus includes a pair of parallel rails 18 forming a track along which a plurality of spaced molds 20 are advanced by means of a flexible chain belt 22. Attached directly to the belt 22 in evenly spaced relation are open top carriers 24 each of which accommodate an inverted mold 20.

Each of the molds 20 typically comprises a pair of stainless steel flanged stampings of matching configuration with each stamping constituting one-half of a mold. The two halves are held together by means of spring clips 26 snapped over the flanges when the two halves are placed against one another. Each mold has an open base and is placed by an operator in an inverted position within a carrier 24. The carrier is provided with a pair of rollers 28 at its upper mid portion and these rollers ride along the rails 18. The chain belt 22 connects to the carriers 24 by means of stub shafts 30 on which the rollers 28 are mounted.

Disposed to one side of the path of travel of the carriers and molds is a sensing device such as an electric eye 32 which is responsive to a mold and carrier passing thereby. This electric eye controls a solenoid 34 for an automatic valve 36 attached to a dispenser 38. This dispenser normally contains a supply of candy 40 in molten form and to this end heating elements 42 may be provided to keep the candy in a liquid state so that it will pour readily into a mold 20 passing below the dispenser.

It will be understood that the molds which are moving to the right as viewed in FIG. 2 will first pass by the electric eye 32 which will thereby actuate the solenoid operated valve 36 so that a measured charge of the molten candy will be released from the dispenser 38 into the open bottom of the inverted mold. Once the measured charge is released from the dispenser, the valve 36 will close and another mold will move into position to receive its charge of molten candy. From the dispensing station the belt 32 will carry the partly filled mold through an opening in a wall 44 for a cooling chamber maintained at a temperature sufficiently low to solidify the molten candy within a relatively short time.

As a mold moves into the cooling chamber, a lug 46 extending out from the side of the carrier 24 rides over a cam or deflector plate 48 which causes the mold and its carrier to pivot about the axis of the stub shafts 30 in a clockwise direction as viewed in FIG. 2. This movement causes the molten pool of candy 40 within the mold cavity to crawl up the cavity walls to a point just at the lip of the open end of the mold. As the mold moves past the cam 48, the lug 46 is released and the mold and its carrier swing freely forwardly in a counterclockwise direction as indicated in the first position of FIG. 4. This counterswing will cause the molten pool to recede from the right-hand side of the cavity walls as viewed in FIG. 4, leaving a deposit or coating of candy which will quickly solidify to form a hard skin 50 over that portion of the cavity wall. At the same time, the liquid candy will crawl up the opposite side of the cavity wall on the counterswing of the mold just up to the lip of the mold as suggested in FIG. 4. As the mold swings back to a normal position, it will leave a deposit on the left-hand wall of the cavity mold which deposit will solidify into a skin 52 on that portion of the cavity wall.

After the back and forth motion caused by the lug 46 engaging the cam 48, the mold is then oscillated from side to side so as to coat the sidewalls of the cavity with a skin 54 as shown in FIG. 5. This is accomplished by means of a slope 56 staggered along the rails 18 one on either rail so that the mold is tipped first to one side by a roller moving up and down the first slope and then being tipped to the other side by the roller on the opposite side moving up and down the slope on the other rail. This action is best shown in FIG. 5.

After the mold is passed through the tipping stations, the inner walls of the mold cavity will be substantially covered by a solidified skin with a pool of molten candy remaining in the center portion of the cavity. The mold with the semi-formed candy is thereupon advanced into an object dispensing station located within the cooling chamber. At this station an object dispensing apparatus 58 of any suitable type deposits the prize object such as the egg shaped toy 12 into the liquid pool of candy and submerges it below the surface of the pool. Since the cavity walls are covered with the solidified skin, the toy will be prevented from touching the cavity walls. It will be understood that if the object were to bear against the cavity walls and the candy harden with the object in that position, a portion of the toy would be exposed to view once the mold is removed from the solidified candy. However, with the hardened skin protecting the cavity walls, the toy will be restricted to the center portion of the candy and will be fully encapsulated.

Once the toy is submerged in the pool, the mold is advanced along the conveyor and the candy completely solidified. The mold then advances out of the cooling chamber, the operator removes the mold from the carrier and finally removes the mold from the now fully solidified candy. The mold may then be replaced in the carrier and returned through the system.

The resulting candy product provides a surprise item which cannot be seen from examining the outside of the candy. The hidden prize within the molded candy is particularly appealing to children and makes for an interesting and popular product in which a wide variety of prizes may be contained within the molded candy.

While the invention has been described with particular reference to the illustrated embodiment, it will be understood that numerous modifications thereto will appear to those skilled in the art. For example, the molten candy may be sprayed into the mold cavity directly against the cavity walls to form the desired protective skin. In this case, that portion of the candy which does not solidify will collect and form a pool within the mold. The toy object may then be submerged in the pool in the same fashion as described above. Also, a great variety of dispensing mechanism may be employed for filling the molds and for placing the object therein. In addition, various means may be provided for oscillating the molds back and forth and from side to side in order to tip the molds and coat the walls with the skin.

Accordingly, the above description and accompanying drawings should be taken as illustrative of the invention and not in a limiting sense.

Having thus described the invention, what I claim and desire to obtain by Letters Patent of the United States is:

1. A method of manufacturing a molded candy having an encapsulated object therein, comprising the steps of
   (a) depositing a quantity of molten candy into a mold to partially fill the mold,
   (b) cooling said mold,
   (c) coating the walls of said mold including the portions above the level of said molten candy with said candy whereby that portion adjacent the mold walls will harden,
   (d) depositing said object in said mold cavity while the center portion of said candy is still in a molten condition whereby said object will submerge below the surface of said molten portion, said candy and said object filling said mold,
   (e) allowing the remainder of said candy to harden into a solidified molded form, and
   (f) removing said mold from said solidified form.

2. A method of manufacturing a molded candy having an encapsulated object therein, comprising the steps of
   (a) depositing hardenable candy in a molten state into a mold cooler than said molten candy and in an amount less than the total volume of said mold to only partially fill the mold,
   (b) coating the walls of said mold including portions above the liquid level of the candy with said candy whereby that portion adjacent the mold walls will solidify,
   (c) submerging said object below the surface of the molten center portion of said candy,
   (d) allowing the remainder of said candy to harden into a solidified molded form, and
   (e) removing said mold from said solidified form.

3. A method of manufacturing a molded candy having an encapsulated object therein, comprising the steps of
   (a) depositing molten candy over the entire inner surface of the walls of a mold cooler than said molten candy whereby that portion of the candy in contact with the mold walls will harden and the excess will collect in a molten pool within said mold partially filling said mold,
   (b) inserting said object in said molten pool and submerging it below the surface thereof to fill said mold,
   (c) allowing all of said candy to harden into a solidified molded form, and
   (d) removing said mold from said solidified form.

4. Apparatus for producing molded candy having a prize object wholly encapsulated therein, comprising
   (a) conveyor means,
   (b) a plurality of open top molds connected in spaced relation along said conveyor means,
   (c) candy dispensing means disposed along the path of travel of said conveyor means for delivering a charge of molten candy into each mold passing thereby,
   (d) cooling means defining a cooling zone along the path of said conveyor for cooling said mold and gradually solidifying said candy,
   (e) deflecting means in said cooling zone and in the path of travel of said molds for tipping said molds sufficiently to coat the walls of said mold with said candy and thereby form a solidified skin over said walls and a molten pool in the center of said mold, and
   (f) object dispensing means in said cooling zone for depositing an object in said pool prior to the solidification of said pool whereby said object will submerge in said pool and said pool will solidify with said object out of contact with the walls of said mold.

5. Apparatus according to claim 4 including detecting means responsive to the presence of a mold for actuating said candy dispensing means.

6. Apparatus for producing molded candy having a prize object wholly encapsulated therein, comprising
   (a) conveyor means,
   (b) a plurality of open top molds detachably connected in spaced relation along said conveyor means,
   (c) candy dispensing means disposed along the path of travel of said conveyor means for delivering a measured charge of molten candy into each mold passing thereby,
   (d) a cooling chamber along the path of said conveyor for cooling said mold and solidifying said candy,
   (e) deflecting means in said chamber and in the path of travel of said molds for tipping said molds sufficiently to coat the walls thereof with said candy and thereby form a solidified skin over said walls and a molten pool in the center thereof of said mold, and
   (f) object dispensing means in said cooling zone for depositing an object in said pool prior to the solidification of said pool whereby said pool will solidify with said object out of contact with the walls of said mold.

7. Apparatus for producing molded candy having a prize object wholly encapsulated therein, comprising
   (a) conveyor means,
   (b) a plurality of open top molds connected in spaced relation along said conveyor means,
   (c) cooling means defining a cooling zone along the path of said conveyor for cooling said mold,
   (d) candy dispensing means disposed along the path of travel of said conveyor means for delivering a charge of molten candy into each mold passing thereby and over the entire inner surface of the walls thereof to thereby form a solidified candy skin over the walls of the mold and a molten pool in the center thereof, and
   (e) object dispensing means for depositing an object in said pool prior to the solidification of said pool whereby said pool will solidify with said object out of contact with the walls of said mold.

References Cited

UNITED STATES PATENTS 2,179,225  11/1939  Thomas _____ 107—54.45
2,267,494  12/1941  Dotzer _____ 107—54.6

WALTER A. SCHEEL, *Primary Examiner.*

J. SHEA, *Assistant Examiner.*